April 23, 1940.  D. A. MASON  2,197,808
MACHINE FOR BALANCING TIRES
Filed May 23, 1938
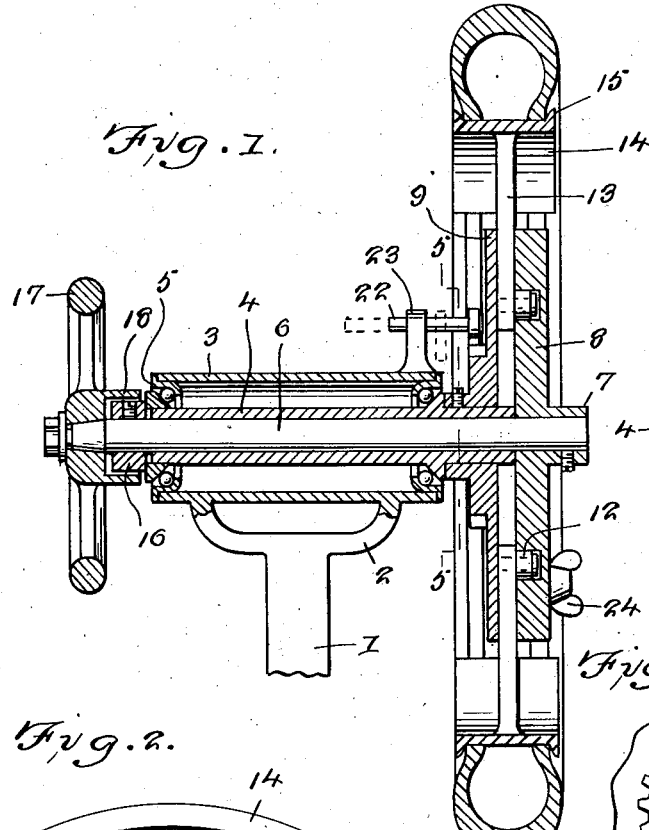
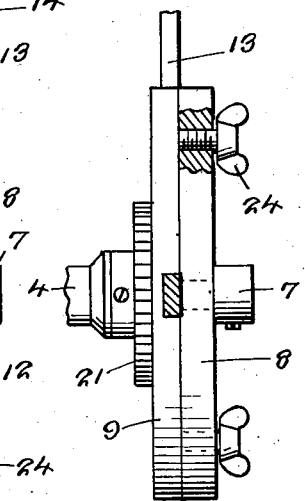
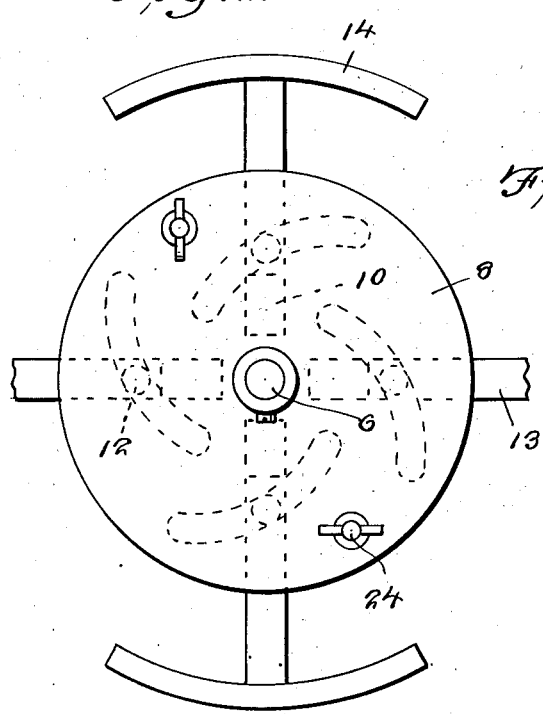
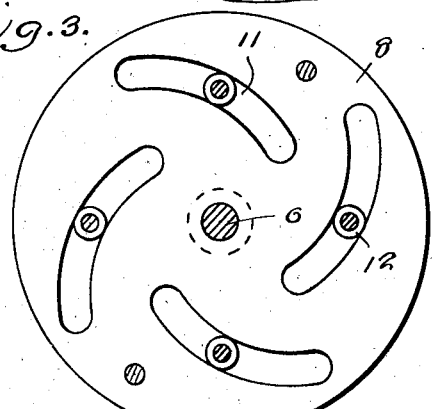
Dennis A. Mason, INVENTOR
BY Victor J. Evans & Co.
ATTORNEYS Patented Apr. 23, 1940

2,197,808

UNITED STATES PATENT OFFICE 2,197,808

MACHINE FOR BALANCING TIRES

Dennis A. Mason, Morgantown, W. Va.

Application May 23, 1938, Serial No. 209,599

2 Claims. (Cl. 144—288)

This invention relates to tire balancing machines, and its general object is to provide a machine that is primarily designed for use while repairing tires and especially during the process of retreading the same, while the tire is on the machine, in that the tire can be held against rotation in a rigid manner while the rebuilding material is applied and worked upon, but can be released from time to time to be tested for balance during the process, and when the proper balance is obtained, the tread is applied and the tire is removed from the machine to be cured in the usual manner.

A further object is to provide a balancing machine that is capable of being adjusted to receive tires of all sizes, and can be operated in an easy and expeditious manner.

Another object is to provide a balancing machine of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a vertical sectional view taken through a tire balancing machine which forms the subject matter of the present invention with parts in section and a tire applied thereto.

Figure 2 is a fragmentary front view thereof.

Figure 3 is a detail view illustrating the inner face of the outer clamping disk plate.

Figure 4 is a fragmentary edge elevation of the clamping disk plates and the relative parts thereof.

Figure 5 is a sectional view taken approximately on line 5—5 of Figure 1.

Referring to the drawing in detail, the reference numeral 1 indicates the supporting means for my machine and which as shown includes an upright which preferably has a disk base formed on the lower end thereof with means therein for fixing the machine with respect to the floor or the like. Formed on and rising from the upright is an arcuate member 2 that has formed on or otherwise secured thereto a hollow cylindrical housing 3 within which is mounted a hollow shaft 4 that rotates in ball bearings 5, the latter including channel race members secured to the ends of the housing 3 and conical race members secured to the shaft 4, with the balls disposed between the race members, as clearly shown in Figure 1.

Rotatably mounted in the hollow shaft 4 and extending beyond the ends thereof, is a solid shaft 6 which has the hub 7 of the outer disk plate 8 secured on one end thereof by a set screw, while the inner or companion disk plate 9 is secured to the adjacent end of the hollow shaft by a set screw and disposed in abutting relation with the adjacent ball race on the hollow shaft, as shown in Figure 1.

The disk plates are disposed in face to face relation and the inner disk plate has grooves 10 in the inner face thereof, that radiate from adjacent its center, to the outer periphery thereof, as best shown in Figure 2, which illustrates that the plate 9 is provided with four grooves, but it may have any number therein, it depending upon the number of saddle members in any particular machine. The inner face of the outer disk plate is privided with four arcuate slots 11 in the form of the machine shown, to receive rollers 12 mounted on the shanks 13 of the saddle members 14, so that the saddle members can be adjusted inwardly and outwardly with respect to each other, to accommodate tires of various sizes, and the shanks 13 are mounted in and guided by the grooves 10. The heads of the saddle members are of course of arcuate formation to follow the curvature of the tire, and the heads have flanges 15 along the edges thereof to hold the tire thereon, as will be apparent upon inspection of Figure 1.

The shaft 6 is held within the hollow shaft by a collar 16 and the outer disk plate, the collar being fixed to the shaft by a set screw, as shown. Mounted on the shaft 6 is a hand wheel 17 that includes an annular flange 18 providing a housing for the collar 16 and the hub of the hand wheel is preferably provided with a conical socket for frictional engagement with the conical end of the shaft 6, but is further held by a nut as shown, so that upon rotation of the hand wheel the outer disk plate is rotated through the medium of the shaft 6.

The hollow shaft is freely movable in the housing, so that the inner disk will rotate in unison with the outer disk. However, the inner disk is held against rotation by a ratchet dog 19 engageable with teeth 20 of a ratchet gear 21 formed on the hub of the inner disk plate and the dog is secured to a handle member 22 mounted for slidable and swinging movement in a bracket 23 formed on or otherwise secured to the housing 3 and rising therefrom as best shown in Figure 1.

The dog is of the double toothed type, and when in the position of Figure 5 it prevents rotation of the parts in one direction. Upon swinging of the dog to engage the opposite side of the ratchet gear 21 it prevents rotation of the parts in an opposite direction, and when the dog is moved to the dotted line position of Figure 1, the parts are free to rotate in either direction.

The disk plates are held for movement in unison by wing bolts 24 that are threaded in the outer disk plate for disposal through the same to engage the inner disk plate, as best shown in Figure 4, and when it is desired to adjust the saddle members, the wing bolts 24 are loosened to release the outer disk plate, the dog is moved to either of its gear engaging positions for holding the inner disk plate against movement, thence the outer disk plate is rotated by the hand wheel, through the instrumentality of the shaft 6, to cause the rollers to ride in the slots 11, the slots being arranged so that upon independent movement of the outer disk plate the saddle members will be moved inwardly or outwardly it depending of course upon the direction of movement of the hand wheel to bring about the proper adjustment of the saddle members and for disposing the same in binding engagement with the bead of the tire, as shown in Figure 1. The wing bolts are then tightened against the inner disk plate, so that the tire can be worked upon or balanced as the case may be, it being obvious that when work is being performed on the tire, the dog is in gear engaging position, as shown in full lines in Figure 1, and when it is desired to balance the tire, the dog is moved to the dotted line position to release the parts and allow free movement thereof.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A tire balancing machine comprising supporting means, a hollow shaft mounted for rotation on the supporting means, a solid shaft rotatably mounted in the hollow shaft, a disk plate fixed to the hollow shaft and having radial grooves therein, a disk plate mounted on the solid shaft in face to face relation with the grooved face of the first disk plate and having arcuate slots therein, tire receiving means including shanks slidably mounted in the grooves for radial movement with respect to the disk plates, means on the shanks and mounted in the slots for movement of the shanks, releasable means for holding the first disk plate against movement, means for rotating the solid shaft for moving the disk plate thereof for adjusting the tire receiving means for the latter to fit tires of various diameters and to set up a binding engagement therewith, and means for securing the disk plates together for rotation in unison.

2. A tire balancing machine comprising supporting means, a hollow shaft mounted for rotation on the supporting means, a solid shaft mounted for rotation in the hollow shaft, a disk plate having radial grooves therein and secured to the hollow shaft, a disk plate having arcuate slots therein and secured to the solid shaft with the slotted face thereof disposed in face to face relation with the grooved face of the first disk plate, tire receiving means including shanks slidably mounted in the grooves for radial movement, tire engaging saddles formed on the outer ends of the shanks, rollers mounted on the inner ends of the shanks and disposed in the slots for adjusting the tire receiving means for the latter to fit tires of various diameters and to set up a binding engagement therewith, a gear on the first disk, a releasable ratchet dog swingingly mounted and engageable with the gear to hold the first disk against movement, a hand wheel for rotating the second disk through the medium of its shaft, and means for securing the disk plates together for rotation in unison.

DENNIS A. MASON.